(12) United States Patent
Chin et al.

(10) Patent No.: US 6,249,847 B1
(45) Date of Patent: Jun. 19, 2001

(54) COMPUTER SYSTEM WITH SYNCHRONOUS MEMORY ARBITER THAT PERMITS ASYNCHRONOUS MEMORY REQUESTS

(75) Inventors: Kenneth T. Chin, Cypress; Phillip M. Jones, Spring; Robert A. Lester, Houston; Gary J. Piccirillo, Cypress; Michael J. Collins, Tomball, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/134,057

(22) Filed: Aug. 14, 1998

(51) Int. Cl.$^7$ .............................. G06F 13/78; G06F 13/14
(52) U.S. Cl. ...................... 711/151; 710/240; 710/241; 710/242; 710/243; 710/244; 711/150; 711/158; 711/167; 711/168; 711/169
(58) Field of Search ..................................... 710/240–244, 710/113, 119; 711/147–151, 158, 167–169; 370/447, 461, 462

(56) References Cited

U.S. PATENT DOCUMENTS

| | | | |
|---|---|---|---|
| 5,065,102 | * 11/1991 | Takanashi et al. | 324/452 |
| 5,634,073 | * 5/1997 | Collins et al. | 710/5 |
| 5,673,416 | * 9/1997 | Chee et al. | 711/151 |
| 5,784,624 | * 7/1998 | Douglass et al. | 710/244 |
| 5,805,838 | * 9/1998 | Sutherland et al. | 710/112 |
| 5,805,840 | * 9/1998 | Dutton | 710/116 |
| 5,809,278 | * 9/1998 | Watanabe et al. | 711/150 |
| 5,862,355 | * 1/1999 | Logsdon | 710/116 |
| 5,875,339 | * 2/1999 | Molnar et al. | 710/240 |
| 5,956,493 | * 9/1999 | Hewitt et al. | 711/113 |
| 6,000,001 | * 12/1999 | Larson | 710/244 |
| 6,006,303 | * 12/1999 | Barnaby et al. | 710/244 |
| 6,016,528 | * 1/2000 | Jaramillo et al. | 710/243 |

OTHER PUBLICATIONS

U.S. application No. 09/112,000, Jul. 8, 1998, Computer System With Adaptive Memory Arbitration Scheme.
U.S. application No. 09/069,458, Apr. 29, 1998, Computer System With Memory Controller That Hides The Next Cycle During The Current Cycle.
U.S. application No. 09/069,515, Apr. 29, 1998, Computer System With Memory Controller That Hides Completion Of A Current Cycle During Next Cycle.
U.S. application No. 09/090,271, Jun. 3, 1998, Computer System With Improved Memory Access.
U.S. application No. 09/047,876, Mar. 25, 1998, Computer System Employing Memory Controller And Bridge Interface Permitting Concurrent Operation.

(List continued on next page.)

*Primary Examiner*—Than Nguyen
(74) *Attorney, Agent, or Firm*—Conley, Rose & Tayon P.C.; Michael F. Heim; Jonathan M. Harris

(57) ABSTRACT

A computer system that includes a CPU, a memory and a memory controller for controlling access to the memory. The memory controller generally includes arbitration logic for deciding which memory request among one or more pending requests should win arbitration. When a request wins arbitration, the arbitration logic asserts a "won" signal corresponding to that memory request. The memory controller also includes synchronizing logic to synchronize memory requests, corresponding to a first group of requests, that win arbitration to a clock signal and an arbitration enable signal. The synchronizing logic includes an AND gate and a latch for synchronizing the won signals. The memory controller also asynchronously arbitrates a second group of memory requests by asserting a won signal associated with the second group requests that is not synchronized to the clock signal. In this manner, the won signals for the second group of requests can be asserted earlier than the synchronized won signals, thereby permitting the asynchronously arbitrated second group memory requests to be performed earlier than otherwise possible.

13 Claims, 7 Drawing Sheets

OTHER PUBLICATIONS

U.S. application No. 09/135,620, Aug. 18, 1998, System And Method For Aligning An Initial Cache Line Of Data Read From Local Memory By An Input/Output Device.

U.S. application No. 09/135,703, Aug. 18, 1998, System And method For Increasing Transfer Performance When Writing A Cache Line From A Peripheral Component To Local Memory.

U.S. application No. 09/135,274, Aug. 17, 1998, System And Method For Improving Processor Read Latency In A System Employing Error Checking And Correction.

* cited by examiner

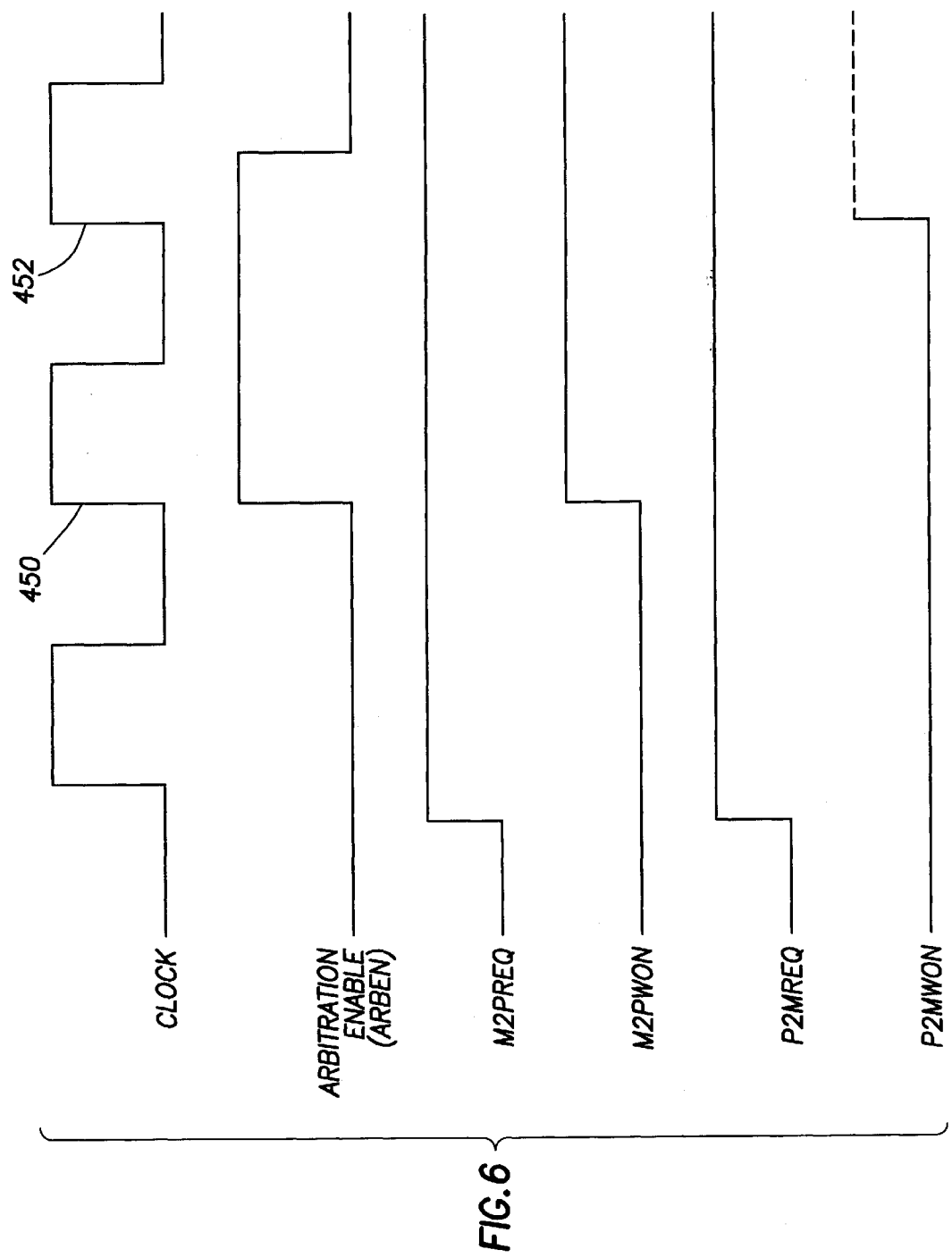

COMPUTER SYSTEM WITH SYNCHRONOUS MEMORY ARBITER THAT PERMITS ASYNCHRONOUS MEMORY REQUESTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to computer systems and, more particularly, to memory controller designs for use in high performance computer systems. Still more particularly, the invention relates to the configuration and operation of an arbiter in a memory controller to permit some types of memory requests to be arbitrated synchronously while other types to be arbitrated asynchronously.

2. Background of the Invention

A personal computer system includes a number of components with specialized functions that cooperatively interact to produce the many effects available in modern computer systems. Early computer systems had relatively few components. As an example, some of the early computer systems included a processor (or CPU), random access memory (RAM), and certain peripheral devices such as a floppy drive, a keyboard and a display. These components typically were coupled together using a network of address, data and control lines, commonly referred to as a "bus."

As computer technology evolved, it became common to connect additional peripheral devices to the computer to provide additional functionality. FIG. 1 shows a representative prior art computer system that includes a CPU coupled to a bridge logic device via a CPU bus. The bridge logic device is sometimes referred to as a "North bridge" for no other reason than it often is depicted at the upper end of a computer system drawing. The North bridge also couples to the main memory array by a memory bus. The North bridge couples the CPU and memory to the peripheral devices in the system through a PCI bus or other expansion bus (such as an EISA bus). The North bridge interconnects and controls the flow of information between the CPU, the memory, the PCI bus, and other buses and devices as desired. Various components that understand PCI protocol may reside on the PCI bus, such as a graphics controller.

If other expansion busses are provided in the computer system, another bridge logic device typically is used to couple the PCI bus to that expansion bus. This bridge logic is sometimes referred to as a "South bridge" reflecting its location vis-a-vis the North bridge in a typical computer system drawing. An example of such bridge logic is described in U.S. Pat. No. 5,634,073, assigned to Compaq Computer Corporation. In FIG. 1, the South bridge couples the PCI bus to an ISA bus. Various ISA-compatible devices are shown coupled to the ISA bus.

The North bridge typically incorporates a memory controller which receives memory access requests and generates standard control signals on the memory bus necessary to access the memory. The memory subsystem typical of most personal computers generally permits only one memory transaction to occur at a time. The North bridge, however, represents a central point through which all requests for memory (either to write data to or read data from memory) must pass. Because many of the devices in a typical computer system, such as those shown in FIG. 1, may need to access memory, the memory controller in the North bridge performs an arbitration function to decide which device in the computer system will be permitted access to memory.

The arbiter in an exemplary memory controller typically implements a predetermined algorithm for deciding which one of a number of pending memory requests to execute ("service") next. The arbitration decision is repeated at regular intervals, often every 10 nanoseconds ($10 \times 10^{-9}$ seconds) or so. A number of steps occur in each arbitration interval. For example, the memory controller may compare the memory address of the request that won arbitration with the previously accessed memory addresses to determine if a match exists. If a match does exist, one or more clock cycles can be saved in set up time for the memory address. As the number of devices that may need access to memory increases in a computer system, the ability of the memory controller to arbitrate and then respond to the winning request in a timely fashion becomes increasingly more difficult.

Memory arbitration typically occurs "synchronously." That is, the arbiter receives the pending memory requests and, at one time decides to which request to award arbitration. This decision is synchronized to an "edge" of a clock signal. A clock signal is a voltage signal whose magnitude toggles (or oscillates) between two voltage levels in a rhythmic, repeating pattern. The winner of arbitration is decided on a rising or falling edge of the clock signal. Memory controllers usually respond to the winning memory request within the next clock cycle. If the clock is a 100 megahertz signal (i.e., the clock signal includes 100 million cycles per second, the memory controller thus would have to respond to the winning request within one cycle, or 10 nanoseconds. Although the amount of time to arbitrate and then respond to a winning memory request may have been sufficient for early computer systems, it is increasingly more difficult to accomplish these tasks in current computer systems which include more and more components requiring access to memory.

For the foregoing reasons, a computer system that includes a memory controller that alleviates the burden described above of previous memory controllers is needed. Such a memory controller would preferably include an arbitration unit that permits sufficient arbitration of the pending memory requests. Unfortunately, to date, no such device is known that provides these features.

SUMMARY OF THE INVENTION

Accordingly, there is provided herein a computer system that includes a CPU, a memory device or array and a memory controller for controlling access to the memory. The computer system preferably includes other devices that may access memory through the memory controller. The memory controller generally includes a memory arbiter comprising arbitration logic for deciding which memory request among one or more pending requests should win arbitration and thereby be given access to memory. When a request wins arbitration, the arbitration logic asserts a "won" signal corresponding to that memory request. The won signal is provided to other logic in the memory controller which performs the memory request.

In accordance with the preferred embodiment, the memory controller also includes synchronizing logic to synchronize memory requests, corresponding to a first group of requests, that win arbitration to an arbitration enable signal generated by the memory arbiter and an edge of a clock signal. The synchronizing logic includes a logic gate, preferably an AND gate, and a latch for synchronizing the won signals to the clock edge. The won signal is asserted by arbitration logic which selects the winning memory request to be logically ANDed with the arbitration enable signal. Then, the synchronized won signal is clocked through the latch to synchronize the won signal and provided as an output signal from the synchronizing logic. Thus, the synchronized won signals are asserted preferably on the first clock edge following the initial assertion of the arbitration enable signal. The synchronized won signals thus are asserted one clock cycle after the enable signal becomes active.

The memory controller also asynchronously arbitrates a second group of memory requests. The arbitration logic also generates won signals associated with this second group of memory requests. The won signals pertaining to the second group to be asynchronously arbitrated are provided to an OR gate to. The won signals preferably are also processed by the synchronization logic described above. The synchronized second group won signals are also provided to the OR gate which asserts its output signal when either the unsynchronized or synchronized won signals become active. By OR'ing together the synchronized and unsynchronized second group won signals, the won signals for the second group of requests can be asserted earlier than all other synchronized won signals. The second group asynchronous won signals are advantageously asserted generally one clock cycle earlier than the synchronized won signals.

Thus, the present invention comprises a combination of features and advantages that enable it to substantially advance the art. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of the preferred embodiment is considered in conjunction with the following drawings, in which:

FIG. 6 is a timing diagram of the memory arbiter of FIG. 5.

DETAILED DESCRIPTION OF PREFERRED EMBODIMENTS

Figure 2:
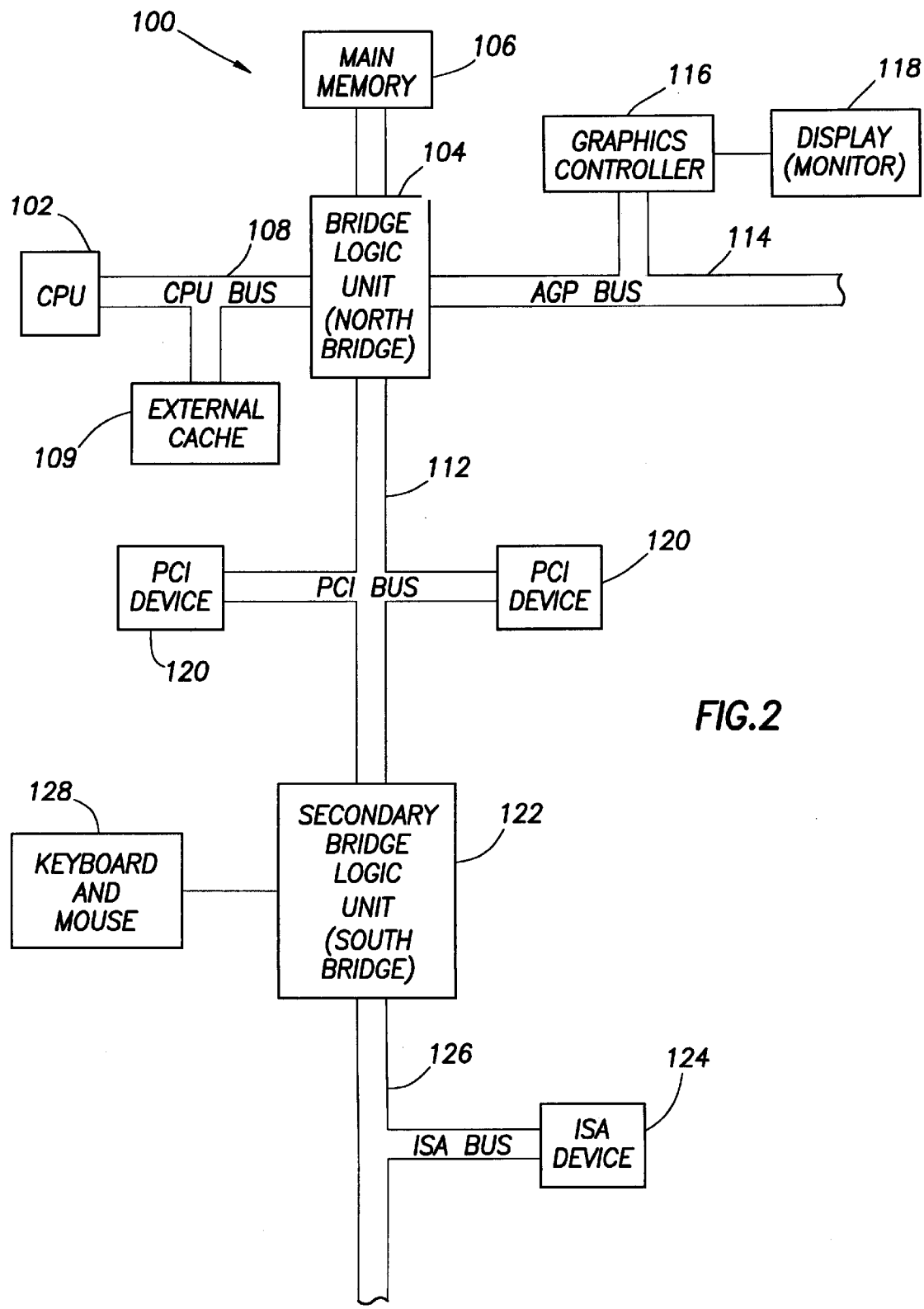
FIG. 2 is a block diagram of a computer system constructed in accordance with the preferred embodiment of the present invention with a bridge logic device that includes a improved memory controller.

Referring now to FIG. 2, a computer system 100 constructed in accordance with a preferred embodiment generally includes a central processing unit ("CPU") 102 coupled to a variety of system components through an integrated bridge logic (or "North bridge") unit 104. The CPU 102 couples to the bridge logic unit 104 via a CPU bus 108. An external memory cache unit 109 may further be coupled to CPU bus 108. As shown, a main memory 106 couples to the bridge logic unit 104 through a memory bus 110, and a graphics controller 116 couples to the bridge logic unit 104 through an Advanced Graphics Port ("AGP") bus 114. A display device (or monitor) 118 couples to the graphics controller 116. Additionally, a plurality of Peripheral Component Interconnect ("PCI") devices 120 couple to the bridge logic unit 104 through a PCI bus 112.

A secondary bridge logic (or "South bridge") unit 122 also may be provided to accommodate an electrical interface to one or more peripheral devices 124 by way of an expansion bus 126. The expansion bus 126 may be implemented using any suitable bus type such as an Industry Standard Architecture ("ISA") bus or an Extended Industry Standard Architecture bus ("EISA"). As the exemplary embodiment of FIG. 2 shows, expansion bus 126 is implemented as an ISA bus and, accordingly, peripheral device 124 represents an ISA device such as a fax/modem or sound card.

In addition to providing an interface to an ISA or EISA bus, secondary bridge logic 122 may further incorporate additional functionality, as desired. For example, in one embodiment, secondary bridge logic unit 122 includes a master PCI arbiter (not shown) for arbitrating ownership of the PCI bus 112. Secondary bridge logic unit 122 may also incorporate a disk drive controller, an interrupt controller, and power management support functionality. An input/output controller (not shown), either external from or integrated with the secondary bridge logic unit 122, may also be included within computer system 100 to provide operational support for a keyboard and mouse 128 and for various serial and parallel ports, as desired.

Referring still to FIG. 2, the CPU 102 is illustrative of, for example, a Pentium® II microprocessor. It should be understood, however, that other alternative types of microprocessors could be employed. Further, an embodiment of computer system 100 may include a multiple CPU architecture, with a plurality of processors coupled through the CPU bus 108 to the bridge logic unit 104.

The main memory 106 generally includes a conventional memory device or an array of memory devices in which application programs and data are stored. Computer system 100 includes any suitable type of memory such as dynamic random access memory ("DRAM") or any of the various types of DRAM circuits such as synchronous dynamic random access memory ("SDRAM").

The PCI devices 120 may include any of a variety of peripheral devices such as, for example, network interface cards, video accelerators, audio cards, hard or floppy disk drives, Small Computer Systems Interface ("SCSI") adapters and telephony cards. Although only two PCI devices 120 are included in the embodiment illustrated in FIG. 2, it should be recognized that computer system 100 may include any number of PCI devices as desired.

Referring still to FIG. 2, the graphics controller 116 controls the rendering of text and images on display 118. Graphics controller 116 may embody a typical graphics accelerator generally known in the art to render three-dimensional data structures on display 118. These data structures can be effectively shifted into and out of main memory 106. The graphics controller 116 therefore may be a master of the AGP bus 114 in that it can request and receive access to a target interface within the bridge logic unit 104 to thereby obtain access to main memory 106. A dedicated graphics bus accommodates rapid retrieval of data from main memory 106. For certain operations, graphics controller 116 may further be configured to generate PCI protocol transactions on the AGP bus 114. The AGP interface of bridge logic 104 (described in greater detail below with reference to FIG. 6) may thus include functionality to support both AGP protocol transactions as well as PCI protocol target and initiator transactions. For the purpose of this disclosure, AGP-related transactions (i.e., transactions initiated by or targeted to the AGP bus) following the PCI protocol are referred to as "GCI" transactions. Display 118 is any electronic display device upon which an image or text can be represented. A suitable display 118 may include, for example, a cathode ray tube ("CRT"), a liquid crystal display ("LCD"), or a virtual retinal display ("VRD"), or any other type of suitable display device for a computer system.

Figure 1:
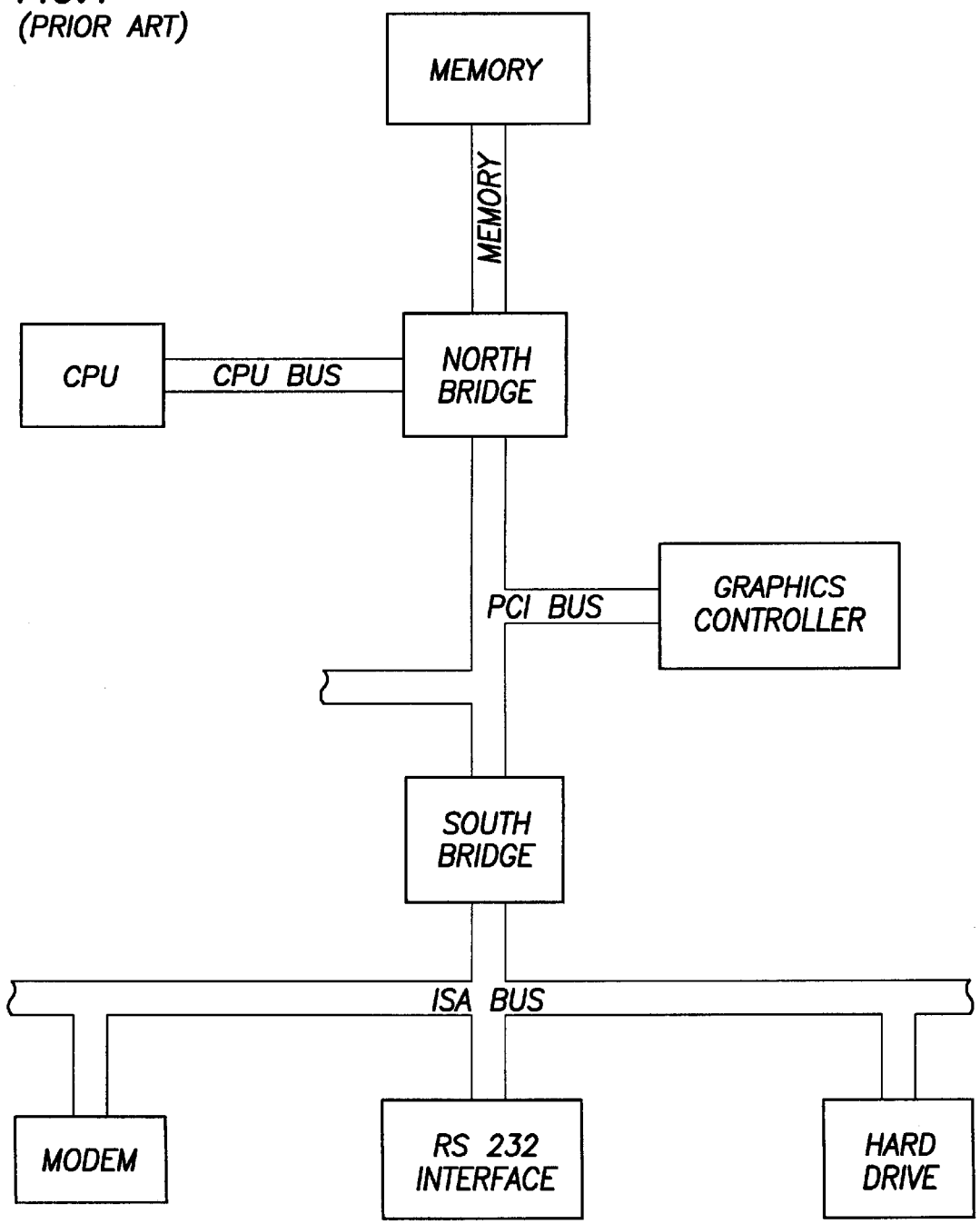
FIG. 1 is a block diagram of a prior art computer system implementing a bridge logic to couple together dissimilar busses.

The following discussion describes an embodiment of computer system 100 for coupling together various computer buses. Computer system 100 can be implemented with respect to the particular bus architectures shown in FIG. 2 (i.e., PCI and AGP buses), or other bus architectures, as desired, The embodiment described herein, however, assumes buses 112 and 114 represent a PCI bus and an AGP bus, as shown in FIG. 1. Further, CPU 102 is assumed to be a Pentium® II processor and thus CPU bus 108 represents a Pentium II bus. These bus protocols and the terminology used with respect to these protocols are well known to those of ordinary skill in the art. If a more thorough understanding of the PCI, AGP, or Pentium® Pro buses is desired, reference should be made to the PCI Local Bus Specification (1993), Accelerated Graphics Port Interface Specification (Intel, 1996), and Intel P6 External Bus Specification.

Figure 3:
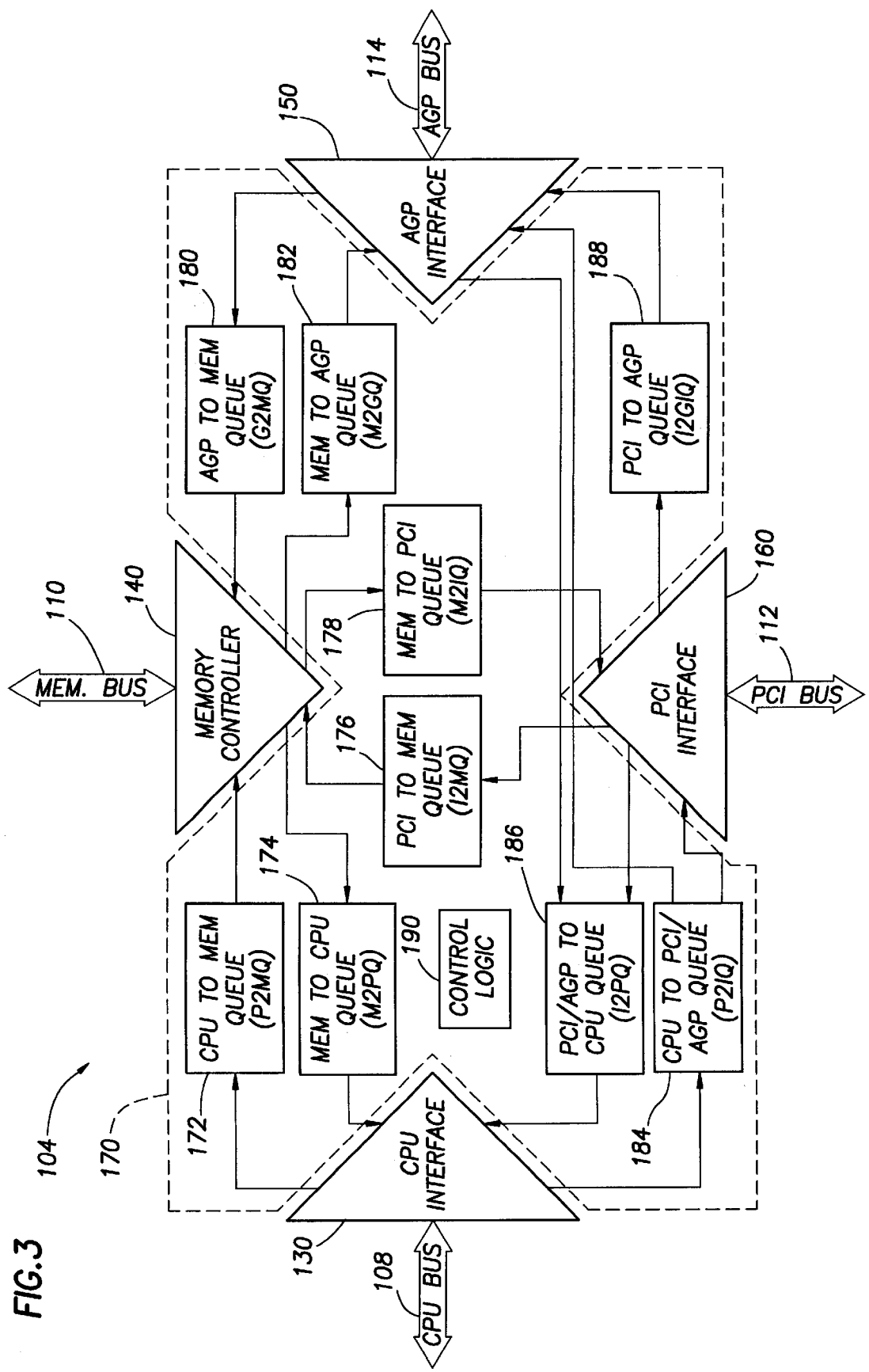
FIG. 3 is a block diagram of a preferred embodiment of the bridge logic unit of FIG. 2 including CPU, PCI, and AGP interfaces, an improved memory controller, and data and address queues between the interfaces and memory controller.

Referring now to FIG. 3, bridge logic unit 104 generally includes a CPU interface 130, a memory controller 140, an AGP interface 150, a PCI interface 160, and queue storage and control logic 170. As shown, the CPU interface 130 preferably couples the bridge logic unit 104 to the CPU bus 108 and also coordinates the transfer of data, address and control signals between the bridge logic 104 and CPU bus 108. The AGP interface 150 and PCI interface 160 in similar fashion interface the bridge logic 104 to the AGP bus 114 and PCI bus 112, respectively. Finally, the memory controller 140 couples to the memory bus 110 and communicates with main memory 106 (FIG. 2).

The queue storage and control logic 170 includes various queue storage elements interconnecting the CPU interface 130, memory controller 140, AGP interface 150, and PCI interface 160. A CPU-to-memory queue (P2MQ) 172 and a memory-to-CPU queue (M2PQ) 174 couple the CPU interface 130 to the memory controller 140. A PCI-to-memory queue (I2MQ) 176 and a memory-to-PCI queue (M2IQ) 178 couple the PCI interface 160 to the memory controller 140. An AGP-to-memory queue (G2MQ) 180 and a memory to AGP queue (M2GQ) 182 couple the AGP interface to the memory controller 140. The AGP interface 150 and the PCI interface 160 couple by way of a PCI to AGP queue (I2GIQ) 188. A CPU to PCI/AGP queue (P2IQ) 184 and a PCI/AGP to CPU queue (I2PQ) 186 couple the CPU interface 130 to the AGP interface 150 and the PCI interface 160 as shown. A control logic unit 190 controls the operation of the various queue storage elements. The input and output connections to the control logic unit 190 have been omitted from FIG. 3 as have the various control signals between the interfaces 130, 150, 160 and memory controller 140. These connections and control signals are more fully described in a pending application entitled "Computer System with Memory Controller and Bridge Interface Permitting Concurrent Operation", filed Mar. 25, 1998.

Generally, the queue storage elements allow data and data transaction requests (such as CPU reads and writes to memory, PCI reads and writes to memory, etc.) to be temporarily stored pending execution by the destination device, thereby permitting the requesting device to perform other tasks until its transaction request is completed. Operation and storage of data transactions in the queue storage elements preferably occurs concurrently allowing data and data transaction requests (including addresses for write requests) among the interfaces 130, 150, 160 and the memory controller 140 to be stored within the bridge logic unit 104.

Concurrent storage of data and transaction requests in the queue storage elements 172, 174, 176, 178, 180, 182, 184, 186, and 188 means that each queue storage element can hold data and/or transaction requests at the same time. Thus, each queue storage element can store data and/or requests independent of all other queue storage elements. By including queue storage elements between the interfaces 130, 150, 160 and memory controller 140 as shown in FIG. 2, and permitting each queue storage element to store data and transaction requests concurrently with all other queue storage elements, the performance of the computer system 100 can be improved. This improvement results from passing data and transaction requests between buses 108, 110, 112, 114 in a more efficient manner. Moreover, traffic between buses is handled more efficiently by maximizing the utilization rate of data paths between pairs of buses (i.e., the percentage of time data and transaction requests pass between one bus and another). For purposes of this disclosure, the terms "transaction" and "cycle" are generally used synonymously.

Figure 4A:
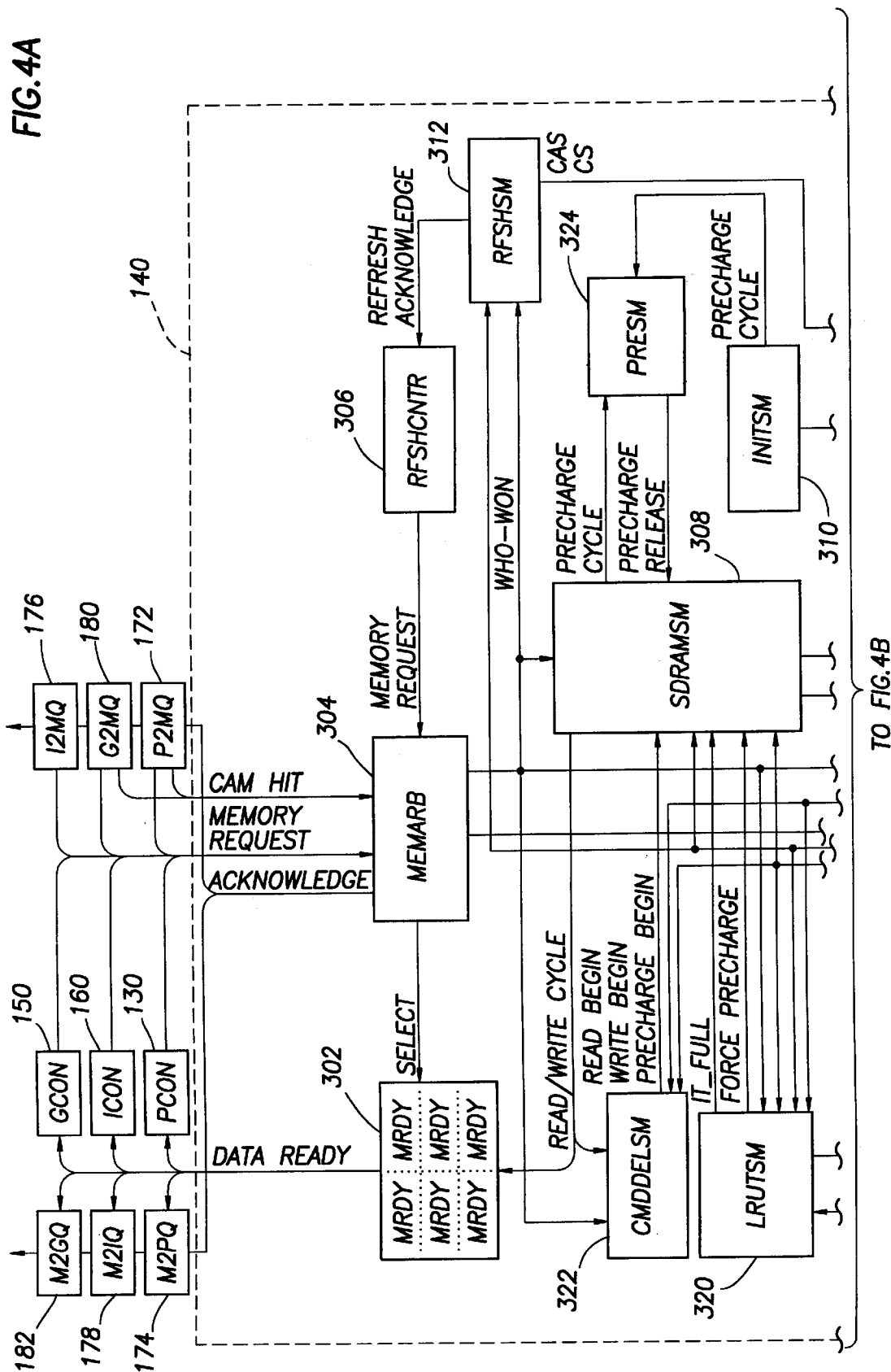
FIGS. 4A and 4B includes a block diagram of the improved memory controller of FIG. 3.
Figure 4B:
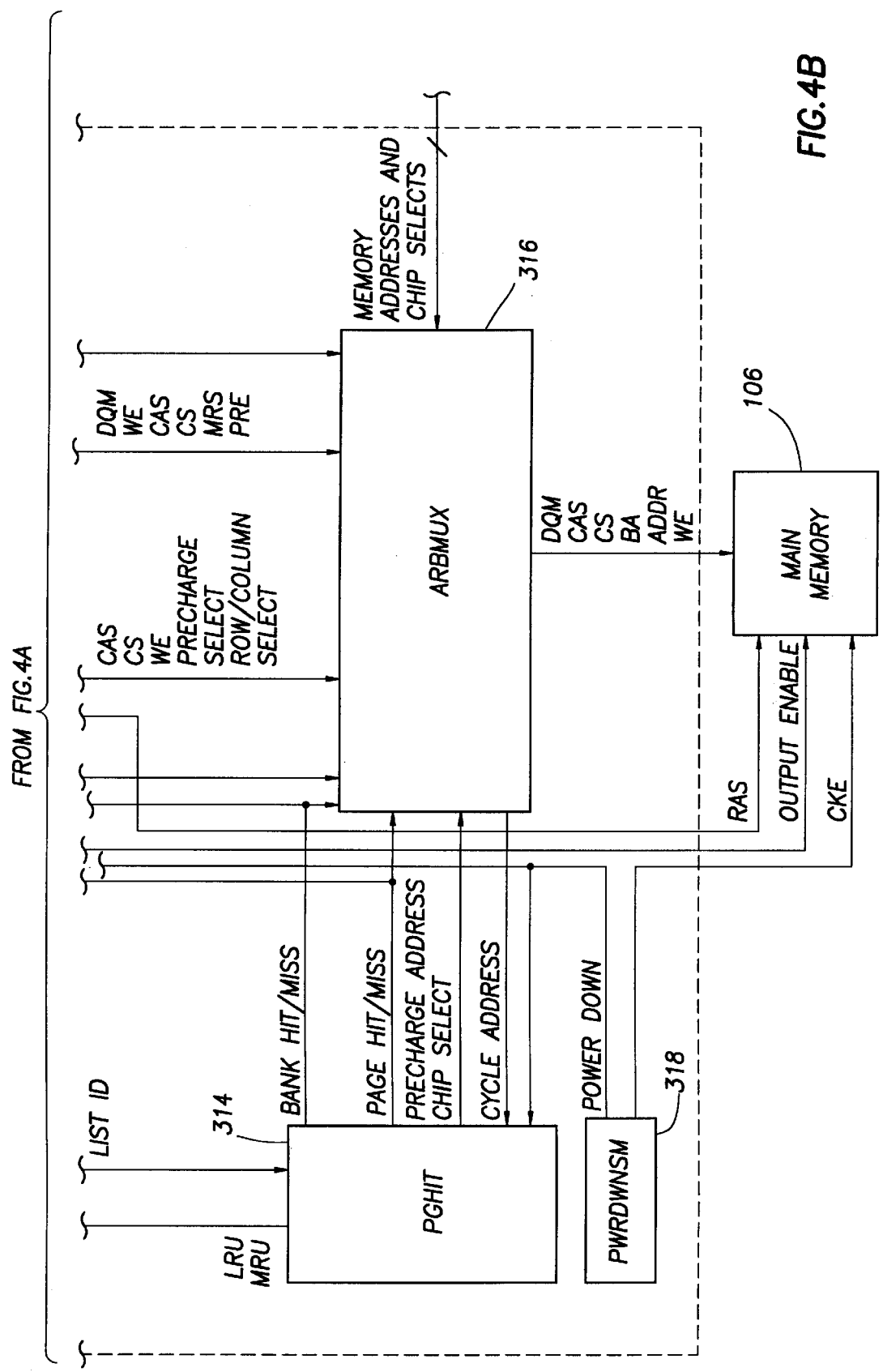

Referring now to FIGS. 4A–B, the memory controller 140 preferably includes a number of state machines comprising logic units whose output values depend on the state of the present input values as well as previous input values. The exemplary embodiment shown in FIGS. 4A–B includes a memory ready state machine (MRDY) 302, a memory arbitration state machine (MEMARB) 304, a refresh counter logic (RFSHCNTR) 306, an SDRAM state machine (SDRAMSM) 308, an initialize state machine (INITSM) 310, a memory refresh state machine (RFSHSM) 312, a page hit logic (PGHIT) unit 314, an arbitration multiplexer (ARBMUX) 316, a power-down state machine (PWRDWNSM) 318, a least recently used tracker state machine (LRUTSM) 320, a command delay state machine (CMDDELSM) 322, and a precharge state machine (PRESM) 324. Each state machine in FIGS. 4A–B couples to one or more other state machines or external interfaces, queues, or configuration registers. The connections between the various state machines, interfaces, and registers may either reflect actual signals or logical states or flags in accordance with known techniques.

The MEMARB state machine 304 receives memory request signals from the RFSHCNTR 306, CPU interface 130, AGP interface 150, the PCI interface 160, as well as the CPU-to memory queue 172, the PCI to memory queue 176, and the AGP to memory queue 180. The MEMARB state machine 304 also receives CAM hit indicator signals from the CPU to memory queue 172 and from the AGP-to-memory queue 180. The CAM hit indicator signals are asserted when a read request and a write request to the same memory address are pending. The MEMARB 304 implements any suitable memory arbitration scheme for deciding which one of multiple pending memory requests is to be serviced during the next memory cycle. Accordingly, in response to the memory request and CAM hit signals, MEMARB 304 asserts a who-won signal which identifies which pending memory request is to be serviced in the next memory cycle. The MEMARB 304 preferably provides the who-won signal to the SDRAMSM 308, CMDDELSM 322, RFSHSM 312, and ARBMUX 316.

If a read request wins memory arbitration, the MEMARB state machine 304 generates a select signal that activates an MRDY 302 associated with that read request. The MRDY 302 state machines determine how much time will pass between generation of the select signal and when the memory bus has valid read data (i.e., CAS latency). When the read data is valid, the MRDY 302 asserts a data-ready signal to the memory to CPU queue 174, memory to PCI queue 178, memory to AGP queue 182, CPU interface 130, AGP interface 150, or PCI interface 160.

Referring still to FIGS. 4A–B, the SDRAMSM state machine 308 couples to the MEMARB 304, PGHIT 314, arbitration multiplexer (ARBMUX) 316, the LRUTSM 320, CMDDELSM 322, and the PRSESM 324 as shown. The SDRAM state machine 308 initiates activate, precharge, read, and write commands to the main memory 106 by asserting the RAS signal directly to the main memory 106 and generating and providing the CAS, CS, WE, precharge select, and row/column select signals to the ARBMUX 316. The RAS signal, along with the ARBMUX 316 output signals, identify the memory location associated with the current memory cycle request. The SDRAMSM 308 also transmits the read/write cycle indicator to the MRDY 302 and the CMDDELSM 322. The read/write cycle signal indicates whether the memory request selected by the MEMARB 304 is a read or write cycle. During a precharge cycle, SDRAMSM 308 asserts a precharge cycle indicator to the PRESM state machine 324. The PRESM 324 then waits until a predetermined amount of time has elapsed before asserting a precharge release indicator to SDRAMSM 308, permitting SDRAMSM 308 to begin the next Activate cycle.

In addition, at the beginning of a read or a write cycle, SDRAMSM 308 transmits a read/write cycle indicator to the CMDDELSM state machine 322. The CMDDELSM 322 then waits until a predetermined amount of time has elapsed before asserting the read begin, write begin, and precharge begin signals, which give permission for the SDRAMSM 308 to issue the next read, write, or precharge command, respectively. Using this technique in conjunction with the bank hit and page hit indicators that PGHIT 314 transmits to the LRUTSM 320, CMDDELSM 322, SDRAMSM 308 and ARBMUX 316, the CMDDELSM 322 and PRESM 324 allow SDRAMSM 308 to temporally separate and/or sustain read, write, and precharge commands. Accurate timing of these commands allows the memory controller 140 to properly couple with the main memory 106.

The INITSM 310 asserts the DQM, WE, CAS, CS, MRS, and PRE signals to ARBMUX 316. These signals are used by the ARBMUX to run cycles to main memory 106 during system initialization (i.e., boot-up). When the main memory 106 first powers on, it must undergo a special sequence of initialization commands that prepare it for operation. As would be understood by one of ordinary skill in the art, the INITSM state machine 310 generates the initialization command sequence via DQM, WE, CAS, CS, MRS, and PRE signals, which it delivers to ARBMUX 316. The ARBMUX 316 accordingly routes these signals from INITSM 310 to main memory 106.

The SDRAMSM 308 preferably asserts precharge cycle indicator signals to the PRESM state machine 324. The PRESM state machine 324 generally determines when the RAS precharge time has been met and asserts precharge release signal to the SDRAMSM 308 to let the SDRAMSM know that an activate command can be issued.

Main memory 106 must undergo a "refresh" process within a predetermined time interval following the previous refresh in order for the memory to maintain its data as is understood by one of ordinary skill in the art. Memory refresh cycles are controlled by the RFSHSM 312. Accordingly, the RFSHCNTR state machine 306 generates periodic refresh requests to MEMARB 304. First, the RFSHSM state machine 312 notifies RFSHCNTR 306 via the refresh acknowledge signal when RFSHSM 312 submits a particular refresh cycle to ARBMUX 316 for execution in main memory 106. Next, after waiting for the predetermined time interval, RFSHCNTR 306 broadcasts a refresh request to MEMARB 304 via a request signal. During the next available memory cycle, MEMARB 304 commands RFSHSM 312 via the who-won signal to submit the refresh cycle to ARBMUX 316. In response, the RFSHSM 312 then submits the request to ARBMUX 316 via CAS and CS signals and asserts the refresh acknowledge signal to alert RFSHCNTR 306 of the refresh cycle submission. The refresh request cycle is repeated at a rate sufficient to maintain the contents of main memory 106.

The ARBMUX 316 receives memory addresses from the CPU-to-memory queue (P2MQ) 172, the CPU interface 130, the PCI-to-memory queue (I2MQ) 176, the PCI interface 160, the AGP-to-memory queue (G2MQ)180, and the AGP interface 150. The ARBMUX 316 provides a cycle address signal to the PGHIT 314, while generating data mask (DQM), column address strobe (CAS), chip select (CS), chip enable (CE), address (ADDR), and write enable (WE) signals to main memory 106.

In accordance with the preferred embodiment, the ARBMUX state machine 316 asserts the DQM, CAS, CS, CE, ADDR, and WE signals which open desired locations in main memory 106. First, ARBMUX 316 receives the who-won signal from MEMARB 304, indicating which memory cycle request has won arbitration. Depending on the arbitration winner, ARBMUX 316 translates the DQM, CAS, CS, CE, ADDR, and WE signals from either the CAS and CS signals provided by RFSHSM 312, the CAS, CS, WE, precharge select and row/column select signals generated by SDRAMSM 308, the precharge address and chip select from PGHIT 314, or the memory address signals produced by the P2MQ 172, the CPU interface, the I2MQ 176, the PCI interface, the G2MQ 180, or the AGP interface.

The PGHIT state machine 314 generally compares the memory address associated with the memory request selected by the MEMARB 304 to a list of recently used banks and pages of memory tracked by the LRUTSM 320 and provided to the PGHIT 314 via the list ID signals. If a match (also referred to as a "hit") exists to a currently open bank, PGHIT 314 asserts the bank hit/miss indicator signal preferably to a logic high state. If no match exists (a "miss") to a currently open bank, PGHIT 314 deasserts the bank hit/miss signal to a logic low state. Similarly, the PGHIT 314 determines if there is a hit to an open page and, accordingly, asserts the page hit/miss. The PGHIT 314 provides the bank hit/miss and page hit/miss signals to the SDRAMSM 308, ARBMUX 316, and LRUTSM 320. The LRUTSM 320 uses these hit/miss signals to adjust its list of recently used pages and banks.

The PGHIT 314 also determines if a cycle address is a hit to either the least recently used (LRU) page or most recently used (MRU) page. If either page is hit, the PGHIT 314 asserts either the LRU hit signal or MRU hit signal (depending on which is hit) to the LRUTSM 320 and to the ARBMUX 316. The LRUTSM state machine 320 asserts a force precharge signal and a LRU tracker full (It_full) signal to SDRAMSM 308. The force precharge signal indicates that an open memory page must be precharged during the next memory cycle. The It_full signal indicates that the LRUTSM 320 is currently tracking the maximum number of open pages for which it has been programmed. Finally, the PWRDWNSM 318 provides a CKE signal to main memory 106 as well as a power-down indicator to RFSHSM 312, SDRAMSM 308, PGHIT 314, and LRUTSM 320.

If the current memory cycle is a read cycle, the MRDY 302 associated with the current read cycle receives the read/write cycle indicator from SDRAMSM 308. A read/write cycle indicator instructs the MRDY 302 to notify its associated queue and interface, via its data-ready signal, that read data is available from main memory 106. There preferably is an MRDY 302 for each type of read cycle, and a single MRDY 302 couples with either the memory to CPU queue 174, memory to PCI queue 178, or memory to AGP queue 182, and also with either the CPU interface 130, AGP interface 150, or PCI interface 160.

The PWRDWNSM 318 controls the steps for powering down the logic associated with the bridge 104. The PWRDWNSM 318 provides a clock enable (CKE) signal to main memory 106 which allows main memory 106 to enter a power-down mode, thereby reducing energy consumption. When PWRDWNSM 318 deasserts CKE, PWRDWNSM 318 also sends a power-down indicator signal to RFSHSM 312, SDRAMSM 308, PGHIT 314, and LRUTSM 320 to signal these state machines that main memory 106 is unavailable.

Main memory 106 is generally organized in "banks" with multiple "pages" per bank as would be understood by one of ordinary skill in the art. Recently opened pages preferably remain open. The LRUTSM 320 keeps track of the most recently accessed pages to expedite additional accesses to those pages. Keeping a page open saves the set-up time that would be required to access that same page in a subsequent memory cycle. The LRUTSM 320 can track any number of recently accessed pages, but preferably tracks four or fewer pages. The number of pages that are tracked by the LRUTSM 320 preferably is programmable and may include 2, 3, or 4 pages.

Figure 5:
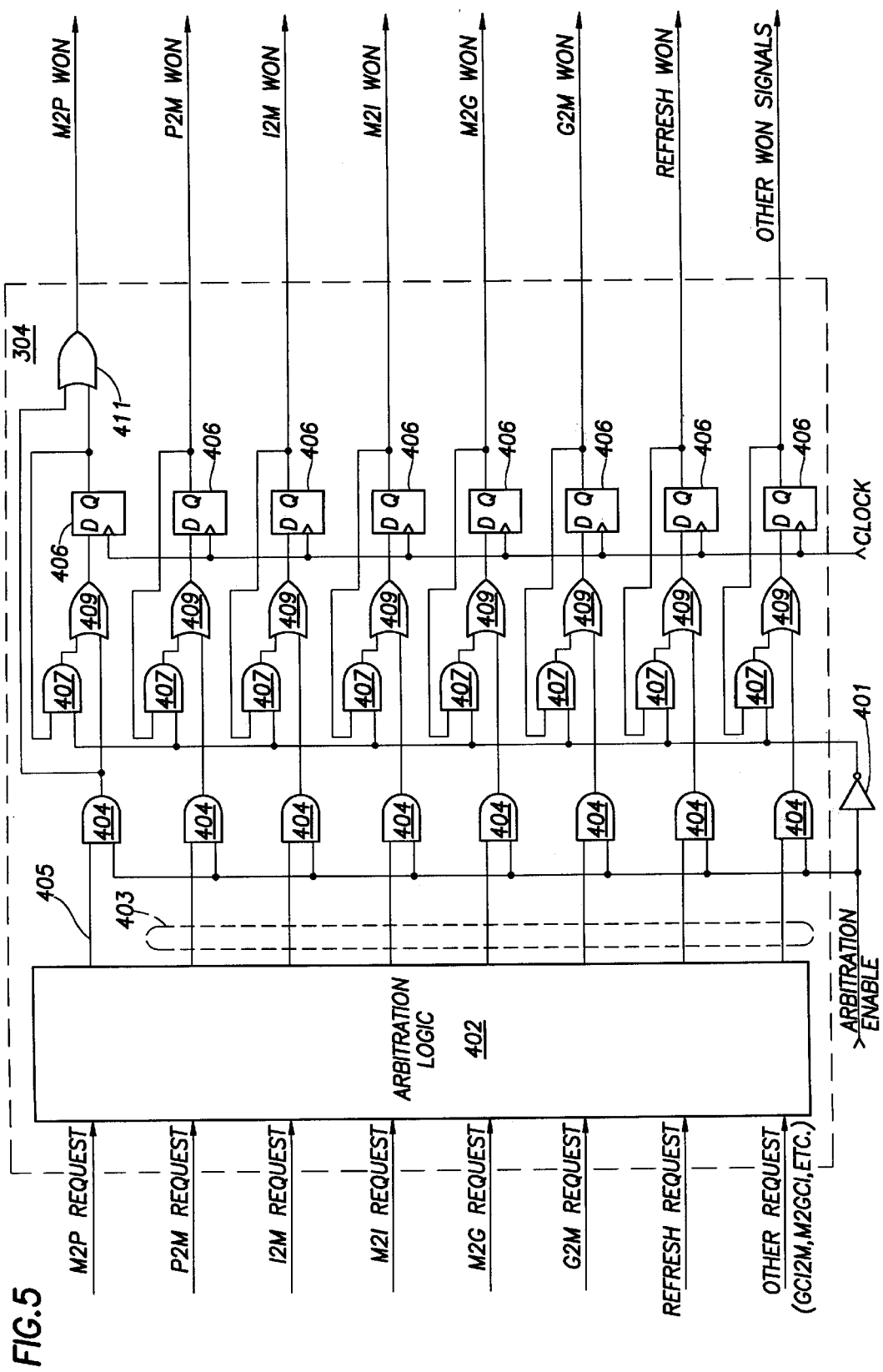
FIG. 5 is a block diagram of the memory arbiter of FIG. 4 including synchronization logic in accordance with the preferred embodiment.

Referring now to FIG. 5, MEMARB 304 generally includes arbitration logic 402, inverter 401, logic gates 404, 407, 409, latches 406, and OR gate 411. Although MEMARB 304 may include other components not specifically shown in FIG. 5, the components shown represent those components that permit MEMARB to synchronously arbitrate among one group of memory requests while asynchronously arbitrating another group of requests. In accordance with the preferred embodiment, arbitration logic 402 receives one or more memory request signals, and preferably at least seven-memory request signals, as shown. Arbitration logic 402 receives an M2P read request from CPU interface 130, a P2M write request from P2MQ 172, an I2M write request from I2MQ 176, an M2I read request from PCI interface 160, an M2G read request from AGP interface 150, a G2M write request from G2MQ 180, and a refresh request from RFSHCNTR 306. If desired, arbitration logic 402 may receive other requests such as memory-to-GCI reads and GCI-to-memory writes.

Arbitration logic 402 preferably synchronously arbitrates among a group of memory requests including the P2M request, the I2M request, the M2I request, the M2G request, the G2M request, and the refresh request. The arbitration logic 402 asynchronously arbitrates among another group of requests comprising preferably the M2P request. It is contemplated that MEMARB 304, however, can be adapted to asynchronously arbitrate among a group of memory request comprising more than just the M2P request, or among a group of requests that does not include the M2P request. The choice of which group of requests will be synchronously arbitrated and which group of requests will be asynchronously arbitrated can be any grouping desired.

Arbitration logic 402 implements logic equations for determining which memory requests among the group of input memory requests to grant access to main memory 106. These logic equations can be any suitable set of equations. The arbitration logic 402 receives the memory request signals and asserts one of its output "won" signals 403 and 405 indicating which memory request won arbitration. The won signals asserted by arbitration logic 402 selected for synchronous arbitration, i.e., the P2M request, I2M request, M2I request, M2G request, G2M request and refresh request, are denoted as won signals 403. Won signal 405 is associated with the M2P request and is asynchronously arbitrated. The won signals 403, 405 pass through logic gate 404 and latches 406. Logic gates 404 preferably comprise AND gates by which the won signals can be enabled upon assertion of the arbitration enable signal which is generated periodically by the MEMARB 304. Although shown as AND gates, logic gates 404 may alternatively include any suitable logic gate through which the won signals can be enabled. The output of each AND gate 404 is provided an input terminal of OR gate 409. The output of OR gate 409 is latched by latch 406 preferably on a rising edge of the clock signal. The AND gate 407 and OR gate 409 preferably comprise holding logic to ensure the asserted won signals remain active to complete the memory transaction even after the arbitration logic 402 deasserts the won signal 403, 405. Holding logic may comprise other logic gates and configurations as desired. As shown, the won signals 403, 405 are synchronized by latches 406 upon a rising edge of the clock signal.

The M2P request signal, however, is also asynchronously arbitrated. The output signal from the AND gate that receives the won signal 405 to the M2P request is provided to OR gate 411. The output signal from OR gate 411 thus is asserted immediately when won signal 405 becomes active. Because the output signal from the latch 46 that receives the won signal 405 is also provided to OR gate 411, the M2P won output signal is asserted upon assertion of the won signal 405 from arbitration logic 402 and remains asserted following the next rising clock edge.

The advantage to asynchronously arbitrating the M2P request signal is illustrated in FIG. 6. As shown, the M2P request signal and the P2M request signal are both asserted indicating that memory read and write requests are pending. In accordance with the preferred embodiment, the M2P request is asynchronously processed by the arbitration logic 402 and thus, the M2P won signal is asserted substantially upon the assertion of the arbitration enable signal. Accordingly, the M2P won signal is asserted approximately upon the rising edge of the arbitration enable signal which, as shown in FIG. 6, occurs on the rising edge 450 of the clock signal. If the P2M request signal, or any other memory request signal requiring synchronous arbitration, is asserted by arbitration logic 402, the won signal corresponding to that memory request signal will be provided as an output signal from MEMARB 304 upon winning arbitration after the rising edge of the arbitration enable signal and coincident with the next rising edge of the clock signal. Thus, as shown, if the P2M request signal was to win arbitration, its corresponding P2M won signal will be asserted on rising edge 452 of the clock signal. The P2M won signal is shown in FIG. 6 in dashed outline indicating that generally only one won signal can be asserted by the arbitration logic 402 at any point in time.

The advantage of the preferred embodiment is apparent from FIG. 6. Because the M2P request signal is asynchronously arbitrated, its corresponding won signal, M2P won, can be asserted a full clock cycle earlier then won signals corresponding to memory requests that are synchronously arbitrated. Thus, certain memory requests can be arbitrated at an earlier time than other memory requests.

Numerous variations and modifications will become apparent to those skilled in the art once the above disclosure is fully appreciated. For example, the preferred embodiment was shown to provide asynchronous arbitration for M2P read requests and synchronous arbitration for all other memory requests. Alternatively, the invention can be implemented by asynchronously arbitrating a different memory request than the M2P request, or arbitrating additional memory requests besides just the M2P request. It is intended that the following claims be interpreted to embrace all such variations and modifications.

What is claimed:

1. A computer system, comprising:

a CPU;

a memory;

a memory controller coupling said CPU to said memory and including:

a memory arbiter which includes arbitration logic and receives a plurality of requests for access to said memory and deciding which memory request wins arbitration for access to said memory, said memory arbiter asserting an output won signal corresponding to the winning memory request;

said memory arbiter synchronizes only a first group of memory requests to a clock signal, and said memory arbiter asynchronously arbitrates a second group of memory requests; and said arbitration logic decides which memory request in said first and second groups wins arbitration, said arbitration logic generates an intermediate won signal associated with the winning request;

wherein said memory arbiter also includes latches for synchronizing the intermediate won signal from the first group to said clock signal.

2. The computer system of claim 1 wherein said memory controller further includes an OR gate which receives said intermediate won signal associated with the second group and generates said output won signal when said intermediate won signal associated with the second group becomes active.

3. The computer system of claim 1 wherein said second group of memory requests that are asynchronously arbitrated includes a CPU-to-memory read request.

4. A memory controller for controlling access to a memory device, including:

memory arbitration logic for receiving a plurality of requests for access to said memory device and deciding which memory request wins arbitration for access to said memory device, and said memory arbitration logic asserting a won signal corresponding to the winning memory request;

synchronization logic for synchronizing won signals corresponding to a synchronous group of memory requests with an edge of a clock signal; and said memory controller also asynchronously arbitrating an asynchronous group of memory requests without synchronizing won signals corresponding to the asynchronous group to said clock signal;

wherein said synchronization logic includes a latch and the won signals corresponding to the synchronous group are coupled to said latch.

5. The memory controller of claim 4 further including a logic gate for asynchronous asserting a won signal pertaining to said asynchronous group.

6. A method for arbitrating among pending memory requests, comprising:

applying a set of arbitration rules to decide which pending memory request should win arbitration;

asserting an intermediate won signal corresponding to the pending memory request that won arbitration;

generating a periodic clock signal;

synchronizing said asserted intermediate won signal with said clock signal only if the memory request corresponding to said won signal belongs to a first group of memory requests comprising CPU-to-memory write requests and read and write requests from peripheral devices;

asserting an output won signal pertaining to a second group of memory requests upon assertion of an intermediate won signal associated with said second group; and wherein said synchronizing step includes latching said intermediate won signal associated with the first group upon assertion of a rising edge of the clock signal.

7. A bridge logic device coupling together a CPU, a peripheral device, and a memory device, said CPU and peripheral device capable of initiating read and write memory requests to said memory device, said memory requests including a first and a second group of requests, said bridge logic device comprising:

arbitration logic for deciding which memory request will be permitted to run to said memory device; and synchronization logic for synchronizing only memory requests from said first group of requests;

wherein said synchronization logic includes a latch for synchronizing said first group of requests.

8. The bridge logic device of claim 7 wherein said second group of requests includes a CPU-to-memory device read request.

9. The bridge logic device of claim 7 wherein said first group of requests includes CPU-to-memory write requests and read and write requests initiated by said peripheral device.

10. The bridge logic of claim 7 further including an OR gate for receiving both an intermediate memory request won signal associated with the second group and asserted by the arbitration logic and an output signal from a latch.

11. The bridge logic of claim 10 wherein said synchronization logic also includes AND gates which receive an arbitration enable signal as an input signal.

12. The bridge logic of claim 11 wherein the output signal from each AND gate is coupled to a latch, each of said latches is activated by a clock signal and generates an output signal that is logically equivalent to the output signal from the AND gate to which it connects.

13. The bridge logic of claim 7 further including memory logic for generating control signals to said memory device and wherein the arbitration logic asserts a won signal when a memory request from said second group wins arbitration, said won signal is provided directly to said memory logic.

* * * * *